US008494348B2

(12) United States Patent
Alexandre et al.

(10) Patent No.: US 8,494,348 B2
(45) Date of Patent: Jul. 23, 2013

(54) METHOD OF MANAGING AND REPRODUCING ADDITIONAL AUDIO FILES OF AN INTERACTIVE OPTICAL DISC

(75) Inventors: Limonov Alexandre, Seoul (KR); Jea Yong Yoo, Seoul (KR); Woo Seong Yoon, Namyangjoo-si (KR); Yong Hoon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1181 days.

(21) Appl. No.: 10/971,802

(22) Filed: Oct. 22, 2004

(65) Prior Publication Data
US 2005/0117890 A1 Jun. 2, 2005

(30) Foreign Application Priority Data

Oct. 22, 2003 (KR) .................. 10-2003-0073802

(51) Int. Cl.
*H04N 5/89* (2006.01)
*H04N 9/80* (2006.01)

(52) U.S. Cl.
USPC .......................................... 386/336; 386/239

(58) Field of Classification Search
USPC ............... 386/46, 95, 98, 106, 124–126, 239, 386/335, 336; 369/47.13; 375/240.01; 370/537–540; 348/423, 468, 563
See application file for complete search history.

(56) References Cited

U.S. PATENT DOCUMENTS

| | | | | |
|---|---|---|---|---|
| 5,920,732 A | * | 7/1999 | Riddle | 710/56 |
| 5,929,857 A | | 7/1999 | Dinallo et al. | |
| 6,185,229 B1 | * | 2/2001 | Obikane et al. | 370/537 |
| 6,249,641 B1 | * | 6/2001 | Yokota | 386/94 |
| 6,507,696 B1 | | 1/2003 | Chung et al. | |
| 6,529,679 B1 | * | 3/2003 | Suito et al. | 386/200 |
| 6,564,255 B1 | | 5/2003 | Mobini et al. | |
| 6,665,751 B1 | * | 12/2003 | Chen et al. | 710/52 |
| 6,754,680 B1 | * | 6/2004 | Motomura et al. | 707/202 |
| 6,885,992 B2 | * | 4/2005 | Mesarovic et al. | 704/500 |
| 6,931,200 B1 | * | 8/2005 | Yamada et al. | 386/95 |

(Continued)

FOREIGN PATENT DOCUMENTS

| | | |
|---|---|---|
| EP | 0 886 276 A2 | 12/1998 |
| EP | 1 457 984 A2 | 9/2004 |
| WO | WO-2004/036576 A1 | 4/2004 |

OTHER PUBLICATIONS

"DVD Book Constructions", Sep. 1, 2003, pp. 1-2, XP007912302, URL:http://www.dvdfllc.co.jp/bookcon.htm, retrieved on Oct. 14, 2003.

*Primary Examiner* — Thai Tran
*Assistant Examiner* — Mishawn Dunn
(74) *Attorney, Agent, or Firm* — Birch, Stewart, Kolasch & Birch, LLP

(57) ABSTRACT

According to method of managing and reproducing additional audio files of an interactive optical disc, additional audio data associated with main video data of an optical disc such as an interactive DVD are recorded as a file of a prescribed format. File information about the additional audio data and buffering information thereabout recorded in the file of a prescribed format. An optical disc apparatus interprets the file information and buffering information and then carries out a series of operations storing and reading out and playing the additional audio data in a way suitable to the buffering area allocated within a buffer. Consequently, additional audio data of various contents are read out from the optical disc or provided by a content providing server connected through the Internet.

16 Claims, 6 Drawing Sheets

U.S. PATENT DOCUMENTS

| | | |
|---|---|---|
| 2001/0043524 A1* | 11/2001 | Utsumi ................. 369/47.13 |
| 2001/0051040 A1* | 12/2001 | Yoshio et al. ............ 386/98 |
| 2002/0049981 A1 | 4/2002 | Tzou |
| 2002/0054635 A1* | 5/2002 | Nagai et al. ........... 375/240.01 |
| 2002/0059276 A1* | 5/2002 | Wei Loon et al. ......... 707/100 |
| 2002/0105951 A1 | 8/2002 | Hannuksela et al. |
| 2002/0181356 A1* | 12/2002 | Watanabe et al. ........ 369/47.16 |
| 2003/0049017 A1 | 3/2003 | Chung et al. |
| 2003/0049029 A1* | 3/2003 | Murakami et al. ......... 396/429 |
| 2003/0161615 A1* | 8/2003 | Tsumagari et al. ........ 386/95 |
| 2004/0139249 A1* | 7/2004 | Chung et al. ............ 710/52 |
| 2004/0234245 A1* | 11/2004 | Jung et al. ............. 386/95 |

* cited by examiner

Case1

ENAV Buffer

Normal Area (36 MB)

Case2

ENAV Buffer

Normal Area (x MB)

Partial Update Area (y MB)

(x+y) MB = 36 MB

Update Audio Buffer state Diagram

METHOD OF MANAGING AND REPRODUCING ADDITIONAL AUDIO FILES OF AN INTERACTIVE OPTICAL DISC

FOREIGN PRIORITY

The present invention claims priority under 35 U.S.C. 119 on Korean Application No. 10-2003-073802 filed Oct. 22, 2003; the contents of which are incorporated by reference in their entirety.

BACKGROUND OF THE INVENTION

1. Field of the Invention

The present invention relates to a method of managing and reproducing additional audio files of an interactive optical disc. More specifically, the present invention provides a means for play control of additional audio data of various contents associated with main video data by reading out from the interactive optical disc or receiving through the Internet.

2. Description of the Related Art

High-density optical discs capable of recording massive digital data, for example, DVDs are in wide use. DVDs are being commercialized as high-capacity recording media capable of recording high-quality video data for many hours as well as digital audio data.

DVD includes a navigation data recording area for recording navigation data needed for play control of said video data and a data stream recording area for recording digital data streams such as said video data.

When a DVD is inserted and successfully loaded, a common DVD player reads out navigation data recorded in said navigation data recording area and stores the navigation data in the memory within the apparatus; thereafter, by using the navigation data, the DVD player carries out DVD playback operations whereby video data recorded in said data stream recording area can be read out and played.

Accordingly, an owner of said DVD player can not only play and watch high-quality video data recorded in said DVD for many hours, but also select and use various functions provided by said DVD.

Recently, IDVD (Interactive DVD) specification is under development, wherein to be described are how additional audio data of various contents associated with video data read out and played from said DVD can be recorded on DVD and subsequently read out and played through user interfaces.

In addition, the specification is supposed to include a means whereby additional audio data of various contents associated with video data read out and played from said IDVD can be received from a content providing server connected through the Internet and subsequently reproduced. However, an efficient means for play control of additional audio data read out from said IDVD or provided from a content providing server has not been established yet, which needs to be provided immediately.

SUMMARY OF THE INVENTION

By taking said situation into account, the present invention is directed to provide a means for managing and reproducing additional audio files of IDVD. More specifically, the present invention provides a means whereby additional audio data of various contents associated with main video data read out and played from an optical disc such as IDVD are read out from the optical disc or received from a content providing server connected through the Internet; and can be reproduced efficiently in association with said main video data.

To achieve said objective, a method of managing additional audio files of an interactive optical disc according to the present invention comprises: recording and managing additional audio data associated with main video data of the interactive optical disc as a file of a prescribed format; and recording and managing file information about said additional audio data and buffering information about the additional audio data within said file of a prescribed format.

A method of reproducing additional audio data of an interactive optical disc according to the present invention comprises: allocating a buffering area to temporarily store additional audio data associated with main video data of the interactive optical disc; searching for and interpreting file information and buffering information about additional audio data to be stored in said buffering area; and according to said interpreted file information and buffering information, storing the additional audio data read out from said interactive optical disc or provided from a content providing server in said buffering area with subsequent reading out and reproduction thereof.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

Hereinafter, preferred embodiments of the present invention for managing and reproducing additional audio files of an interactive optical disc will be described in detail with reference to appended drawings.

Figure 1:
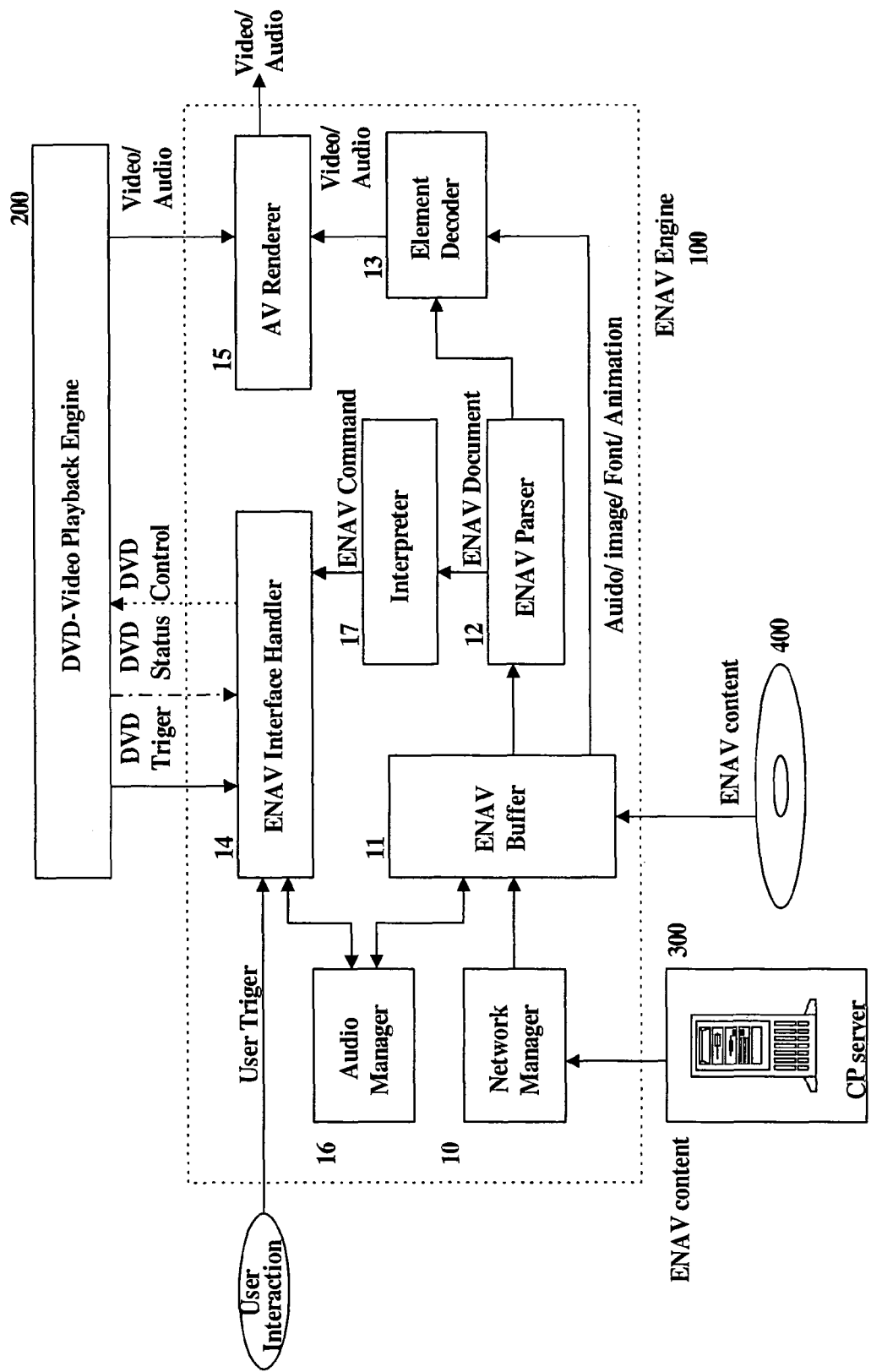
FIG. 1 illustrates the structure of an interactive optical disc apparatus according to the present invention.

FIG. 1 illustrates the structure of an interactive optical disc apparatus according to the present invention. An IDVD player includes an ENAV engine 100 comprising a network manager 10, ENAV buffer 11, ENAV parser 12, element decoder 13, ENAV interface handler 14, A/V renderer 15, audio manager 16, and interpreter 17; and a DVD-Video playback engine 200 operating in association with said ENAV engine.

Figure 2:
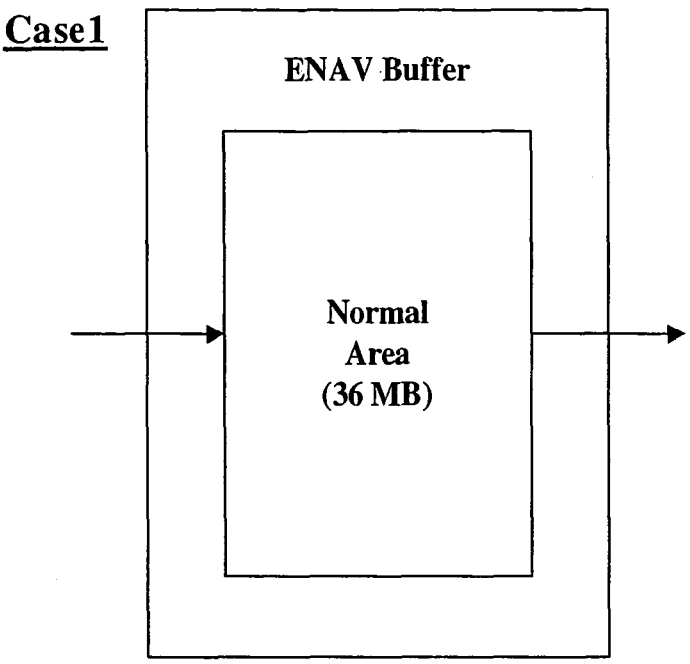
FIG. 2 illustrates a state where ENAV buffer of an interactive optical disc according to the present invention is allocated in a normal area or partial update area.
Figure 2:
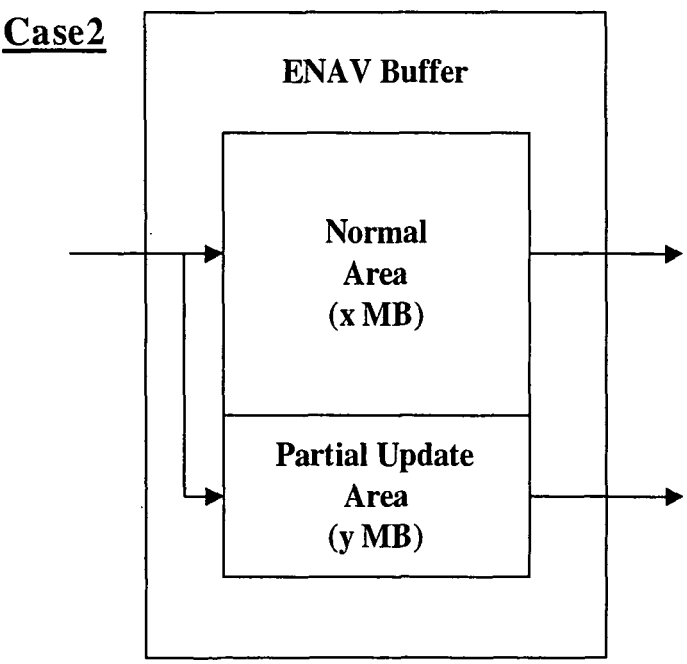

As shown in FIG. 2, the said ENAV buffer 11 can be assigned to a single normal area (NA) occupying a predetermined recording size (for example, 36 Mbytes). Alternatively, the ENAV buffer can be divided into a normal area and partial update area (PUA), each of which can occupy an arbitrary recording size (for example, x MB, y MB, (x+y) MB=36 Mbytes) and can have a variable recording size different from each other.

The said ENAV buffer 11 stores audio data of ENAV contents transmitted from a content providing server 300 connected through the Internet or read out from an interactive DVD 400. The said audio manager 16, through said ENAV interface handler 14, carries out a series of operations for storing and play control of audio data against said ENAV buffer 11.

Figure 3:
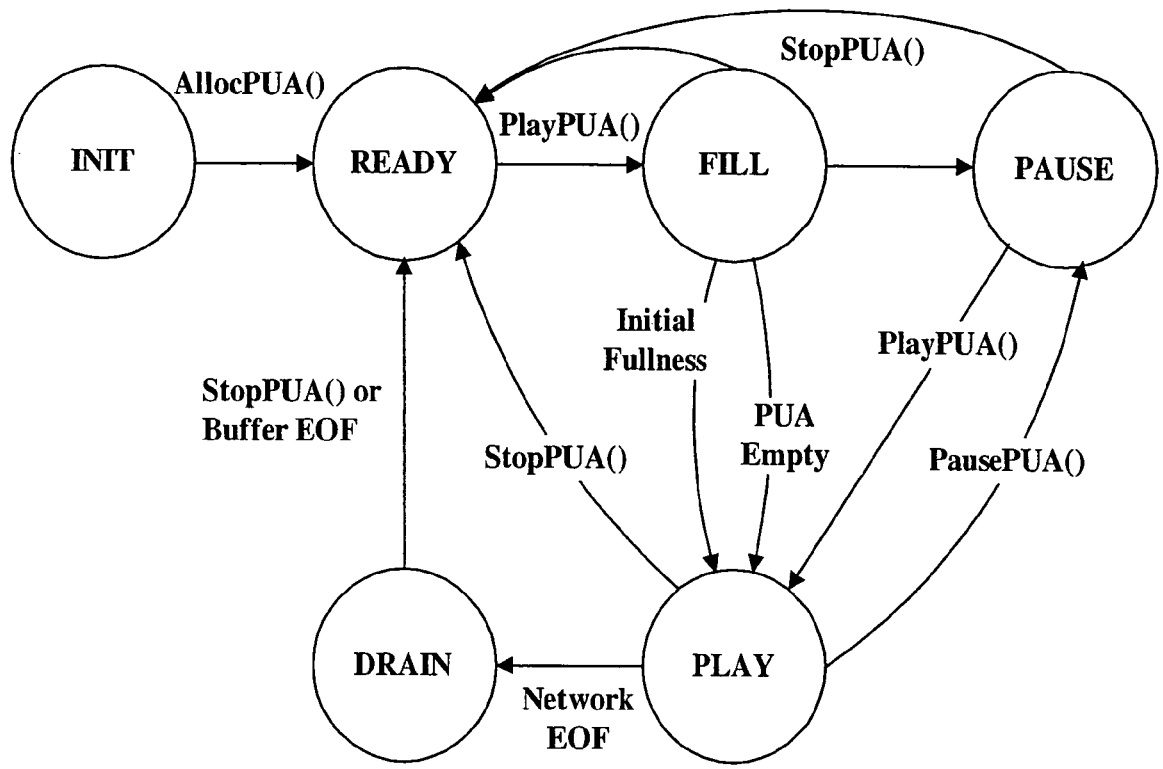
FIGS. 3 and 4 illustrate associated states between INIT, READY, FILL, PLAY, PAUSE, and DRAIN operation carried out in an optical disc apparatus according to the present invention.

For instance, as shown in FIG. 3, the said audio manager 16 allocates a PUA within said ENAV buffer 11 through the interface with said ENAV interface handler 14 and stores audio data of ENAV contents within said PUA, which subsequently carries out a series of INITIAL, READY, FILL and PLAY operation for reading out and playing the audio data.

On the other hand, the said audio manager 16, upon request from a user, carries out a series of PAUSE and DRAIN operation for stopping playback of audio data read out from said ENAV buffer 11 or deleting audio data stored in said ENAV buffer.

During said INITIAL operation, the PUA within said ENAV buffer 11 is allocated by an arbitrary recording size (AllocPUA()). For example, when the start address and end address of said PUA are different, NA and PUA are allocated separately, each having an arbitrary recording size. Otherwise, only a single NA is allocated without PUA.

During said READY operation, according to file information about audio data to be stored within said PUA such as a file name (ex: audiol.ac3) and data type (ex: audio/ac3); and buffering information such as buffering area (ex: buffer=PUA) and initial buffering size (ex: Initial_Fullness=100K), a series of preparation operations corresponding thereto are carried out.

Figure 4:
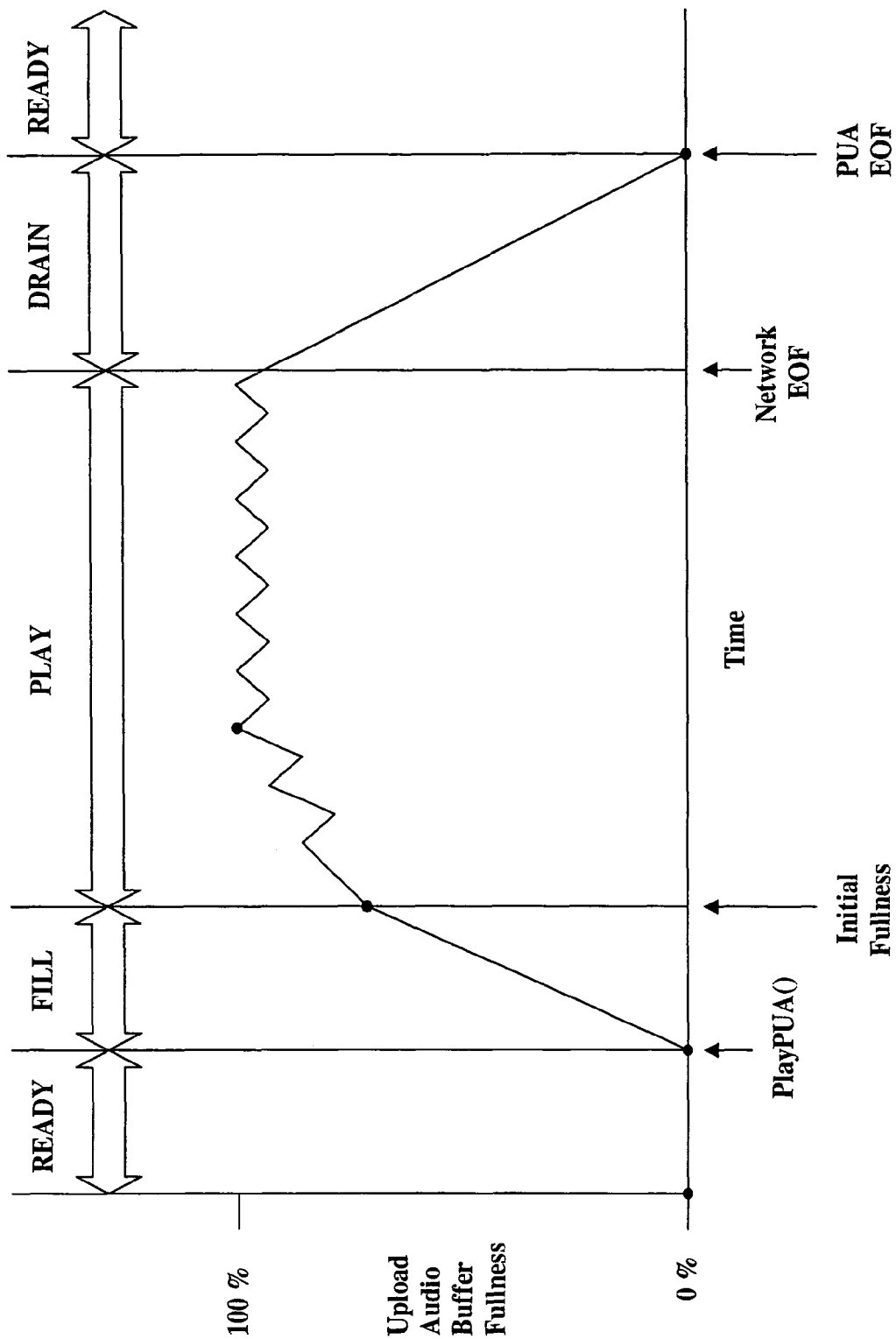

As shown in FIG. 4, after said READY operation is carried out, a series of FILL operations are carried out wherein audio data of ENAV contents are loaded into PUA allocated within said ENAV buffer 11. During said FILL operation, when storing audio data amounting to the initial buffering size (Initial_fullness) is completed, for example, when the initial buffering size is 100K under the condition that the recording size of said PUA is assigned as 512K, on storing audio data of 100Kbytes in said PUA, the said audio manager 16 carries out PLAY operation reading out and playing audio data of the 100K byte.

During the PLAY operation carried out in said manner, when network connection is lost (Network EOF), DRAIN operation is carried out, during which audio data stored in said ENAV buffer are deleted. Subsequently, said READY operation is carried out again, for which case a loading information file and load file are newly defined and managed so that INITIAL, READY, FILL, and PLAY operation against audio data of ENAV contents provided by a content providing server can be carried out in a normal manner.

Figure 5:
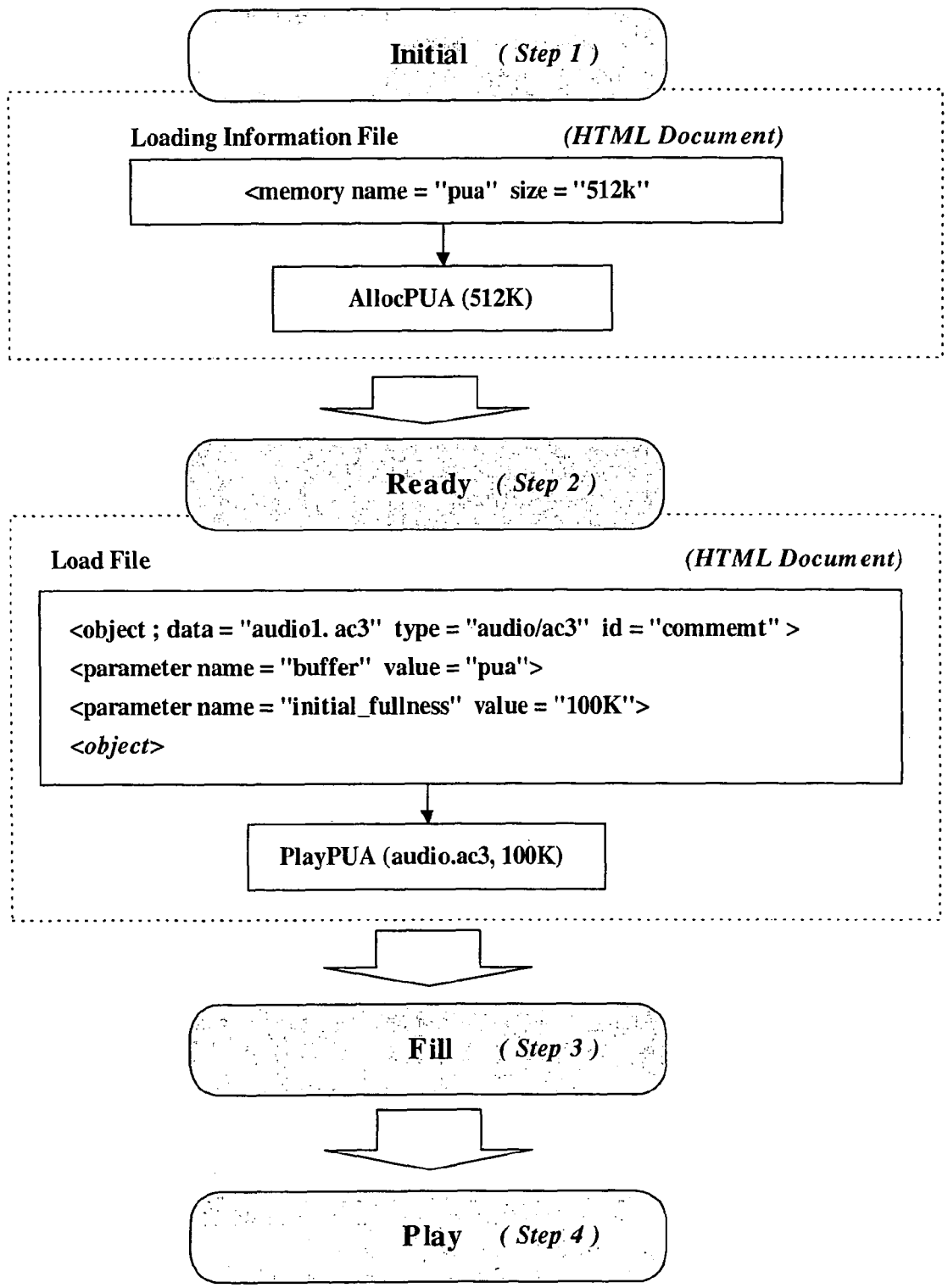
FIGS. 5 and 6 illustrate embodiments of a method of managing and reproducing additional audio files of an interactive optical disc according to the present invention.

As shown in FIG. 5, the loading information file according to the present invention (ex: HTML document) can include information for allocating PUA within said ENAV buffer 11 by an arbitrary recording size. For example, when memory name="pua" and size="512K" are recorded in said loading information file, the said interpreter 17 interprets that allocation of PUA having a recording size of 512 Kbytes within ENAV buffer has been specified and transmits a corresponding command to said ENAV interface handler 14. The said audio manager 16 then carries out INITIAL operation allocating PUA of 512 Kbytes within said ENAV buffer through said ENAV interface handler (Step 1).

The load file according to the present invention can include file information such as a file name of audio data, file type, and proper ID; and buffering information such as a buffering area, initial buffering size along with objects of audio data. For example, when data="audiol.ac3" and type="audio/ac3" are recorded in said load file, the said interpreter 17 interprets that the file name of audio data is "audiol.ac3"; the type of audio data is "ac3"; and the proper ID is "comment".

When parameter name="buffer", value="pua", parameter name="initial_fullness", and value="100K" are recorded in said load file, the said interpreter 17 interprets that buffering of audio data in PUA and carrying out playback operation on completion of buffering 100 Kbytes of the audio data in the PUA have been specified, after which transmits a corresponding command to said ENAV interface handler 14. According to the command, the said audio manager 16 then carries out READY (Step 2), FILL (Step 3), and PLAY (Step 4) operation in sequential order through said ENAV interface handler 14.

Figure 6:
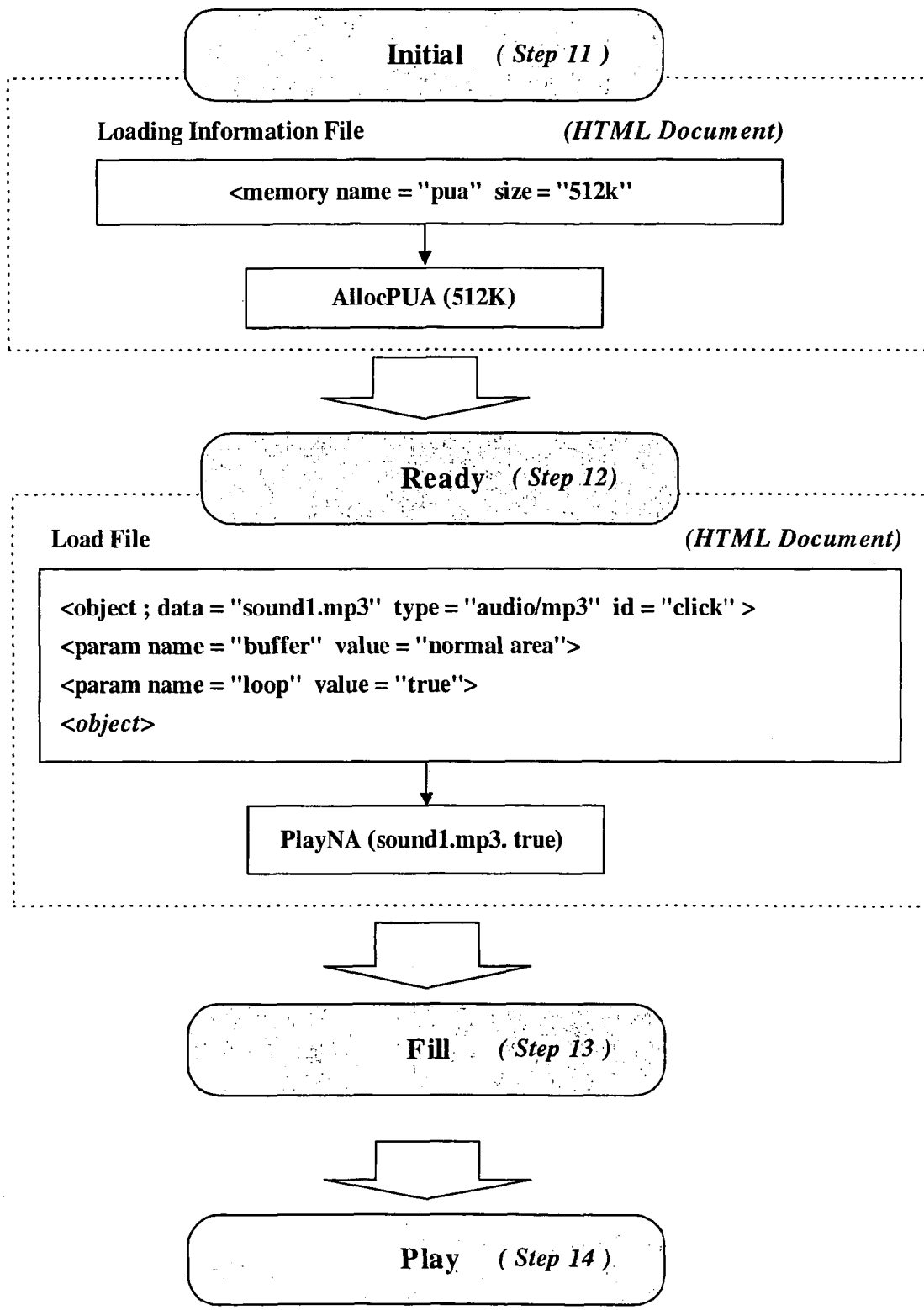

On the other hand, as shown in FIG. 6, the said load file can record so that data="sound1.mp3", type="audio/mp3", and id="click". In this case, the said interpreter 17 interprets that the file name of audio data is "sound1.mp3"; the type of audio data is "mp3"; and the proper ID is "click".

When recorded in said load file are parameter name="buffer", value="normal area", parameter name="loop", and value="true", the said interpreter 17 interprets that buffering audio data in the NA and pre-loading of audio data thereto have been specified, after which subsequently transmits a corresponding command to the said ENAV interface handler 14. According to the command, the said audio manager 16 then carries out READY (Step 12), FILL (Step 13), and PLAY (Step 14) operation in sequential order through the said ENAV interface handler 14.

On the other hand, when a menu button is selected and input, the audio data pre-loaded to the NA in said manner can be reproduced by a particular sound producing the sound of click effect. In addition, determination of the buffering area for storing said audio data can be selectively decided according to the author who authored the corresponding audio file or recording size of audio data.

A method of managing and reproducing additional audio files of an interactive optical disc according to the present invention is a very useful invention which enables additional audio data of various contents read out from the optical disc or received from a content providing server connected to the Internet to be reproduced efficiently in association with main video data.

The foregoing description of preferred embodiments of the present invention has been presented for purposes of illustration; therefore, those skilled in the art may utilize the invention and various embodiments with improvements, modifications, substitutions, or additions within the spirit and scope of the invention as defined by the following appended claims.

What is claimed is:

1. A method of managing additional data associated with main video data, the method comprising:
   storing file information and buffering information about the additional data in a buffer of a device for reproducing data from a recording medium; and
   storing the additional data associated with the main video data of the recording medium as a file of a prescribed format in the buffer of the device,
   wherein the file information includes a file name and a data type, and the buffering information includes information for specifying a position and a size of a buffering area to be allocated for storing the additional data before recording the additional data in the buffer of the device for reproducing data from the recording medium, the buffering information further including information for specifying an initial buffering size of the additional data,
   wherein when the additional data amounting to the initial buffering size is buffered in the allocated buffering area, the buffered additional data begins to be recorded or played, the size allocated to the buffering area being different from the initial buffering size of the additional data, wherein the additional data is stored in the buffer allocated according to the buffering information, wherein the position of the buffering area for storing the additional data is selectively decided according to the information for specifying the buffering area of the additional data, and wherein the position of the buffering area indicates a partial update area or a normal area in the buffering area in which the normal area and the partial update area are separately allocated.

2. The method according to claim 1, wherein the file information and buffering information are recorded and managed by an HTML format provided through the Internet.

3. The method according to claim 1, wherein the buffering information further includes information for specifying pre-loading of the additional data.

4. A method of reproducing additional data associated with main video data, the method comprising:
  (a) interpreting file information and buffering information about the additional data to be stored in a buffering area of a buffer of an apparatus for reproducing data from a recording medium;
  (b) allocating a position and a size of a buffering area for storing the additional data on the buffer of the apparatus for reproducing data from a recording medium according to the buffering information, the buffering area being allocated for temporarily storing the additional data associated with the main video data; and
  (c) storing the additional data read out from the recording medium or received from a content providing server into the buffering area with subsequent reading out and reproduction thereof, wherein the file information includes a file name and a data type, and the buffering information includes information for specifying the buffering area to be allocated in the buffer of the apparatus for reproducing data from the recording medium, the buffering information further including information for specifying an initial buffering size of the additional data, wherein when the additional data amounting to the initial buffering size is buffered in the allocated buffering area, the buffered additional data begins to be recorded or played, the size allocated to the buffering area being different from the initial buffering size of the additional data, wherein the position of the buffering area for storing the additional data is selectively decided according to the information for specifying the buffering area of the additional data, and wherein an initial operation including allocating a normal area and a partial update area separately within the buffer is carried out, the position of the buffering area indicating one of the partial update area and the normal area for storing the additional data.

5. The method according to claim 4, wherein a ready operation is carried out in the step (a), which searches for and interprets information corresponding to data file name, type, buffering area, and the initial buffering size recorded in a load file; and then prepares operations for storing and reproducing the additional data to and from the partial update area.

6. The method according to claim 4, wherein a ready operation is carried out in the step (a), which searches for and interprets information corresponding to data file name, type, buffering area, and pre-loading recorded in a load file; and then prepares operations for storing and reproducing the additional data to and from the normal area.

7. The method according to claim 4, wherein filling and playing operations are carried out in the step (c), which, according to the interpreted file information and buffering information, store the additional data read out from the recording medium or received from the content providing server into the buffering area with the subsequent reading out and reproduction thereof.

8. The method according to claim 4, wherein the file information and buffering information are interpreted by an interpreter included in the apparatus for reproducing data from the recording medium.

9. An apparatus for managing additional data files associated with a main video data, the apparatus comprising:
  a buffer configured to store data; and
  a controller configured to control a storing of file information and buffering information about the additional data and to control a storing of the additional data associated with the main video data recorded on a recording medium as a file of a prescribed format, wherein the file information includes a file name and a data type, and the buffering information includes information for specifying a position and a size of a buffering area to be allocated before recording the additional data in the buffer of a device for reproducing data from the recording medium, the buffering information further including information for specifying an initial buffering size of the additional data, wherein the controller is configured to allocate the buffering area of the buffer according to the buffering information, and to selectively decide the position of the buffering area for storing the additional data according to the information for specifying the buffering area of the additional data, wherein the controller is configured to begin to play the buffered additional data when the additional data amounting to the initial buffering size is buffered in the allocated buffering area, the size allocated to the buffering area being different from the initial buffering size of the additional data, and wherein the position of the buffering area indicates a partial update area or a normal area in the buffering area in which the normal area and the partial update area are separately allocated.

10. The apparatus as recited in claim 9, wherein the file information and buffering information are recorded in an HTML format.

11. The apparatus as recited in claim 9, wherein the buffering information further includes information for specifying pre-loading of the additional data.

12. An apparatus for reproducing additional data associated with main data stored in a recording medium, the apparatus comprising:
  a buffer having at least one buffering area;
  a playback engine configured to reproduce the main video data stored in the recording medium;
  an interpreter configured to interpret file information and buffering information about the additional data to be stored in the at least one buffering area; and
  a data manager configured to allocate a position and a size of the at least one buffering area for storing the additional data on a buffer of an apparatus for reproducing data from the recording medium, the buffering area to be allocated for temporarily storing the additional data associated with the main video data before storing the additional data, to search for the file information and the buffering information about the additional data to be stored in the at least one buffering area, the buffering information further including information for specifying an initial buffering size of the additional data, and, according to the file information and buffering information interpreted by the interpreter, to store the additional data read out from the recording medium or received from a content providing server into the at least one buffering area with subsequent reading out and reproduction thereof, wherein the file information includes a file name and a data type, and the buffering information includes information for specifying the position and the size of the at least one buffering area, wherein the data manager is configured to begin to perform a playing operation of playing the buffered additional data when the additional data amounting to the initial buffering size is buffered in the allocated buffering area, the size allocated to the buffering area being different from the initial buffering size of the additional data, and wherein the data manager is configured to perform an initial operation including allocating a normal area and a partial update area separately within the buffer, the position of the buffering area indicating one of the partial update area and the normal area for storing the additional data.

13. The apparatus as recited in claim 12, wherein the data manager is configured to perform a ready operation including searching for information corresponding to data file name, type, buffering area, and the initial buffering size recorded in a load file, and to prepare operations for storing and reproducing the additional data to and from the partial update area.

14. The apparatus as recited in claim 12, wherein the data manager is configured to perform a ready operation including searching for information corresponding to data file name, type, buffering area, and pre-loading recorded in a load file, and to prepare operations for storing and reproducing the additional data to and from the normal area.

15. The apparatus as recited in claim 12, wherein a size of the partial update area in the buffer is variable.

16. The apparatus as recited in claim 9, wherein a size of the buffering area in the buffer is variable.

* * * * *